United States Patent
Miyamoto et al.

[11] Patent Number: 5,808,817
[45] Date of Patent: Sep. 15, 1998

[54] LENS BARREL

[75] Inventors: Hidenori Miyamoto, Urayasu; Hiroshi Wakabayashi, Yokohama, both of Japan

[73] Assignee: Nikon Corporation, Tokyo, Japan

[21] Appl. No.: 864,916

[22] Filed: May 29, 1997

[30] Foreign Application Priority Data

May 30, 1996 [JP] Japan .................................. 8-136395

[51] Int. Cl.⁶ .................................................. G02B 7/02
[52] U.S. Cl. ............................ 359/819; 359/811; 264/1.1
[58] Field of Search .................................. 359/811, 819, 359/820, 645, 646; 264/1.1

[56] References Cited

U.S. PATENT DOCUMENTS

| | | | |
|---|---|---|---|
| 4,303,306 | 12/1981 | Ookawa | 359/819 |
| 4,506,951 | 3/1985 | Yamada | 359/820 |
| 5,177,641 | 1/1993 | Kobayashi et al. | 359/820 |

*Primary Examiner*—Loha Ben
*Attorney, Agent, or Firm*—Morgan, Lewis & Bockius LLP

[57] ABSTRACT

Disclosed is a lens assembly constructed of lenses and a lens frame for holding the lenses at predetermined intervals to make optical axes of the lenses coincident. Space walls contacting face-to-face lens surfaces of the two lenses to keep a spacing therebetween are integrally provided in at least three positions at equal intervals in the peripheral direction along an inner peripheral portion of the lens frame. Inner peripheral wall portions for holding at least two lenses in the lens frame, are formed by one of molding dies.

6 Claims, 5 Drawing Sheets

FIG. 4A
PRIOR ART
FIG. 4B
PRIOR ART
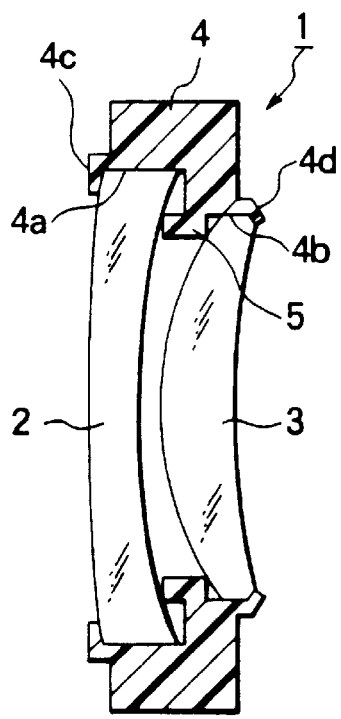
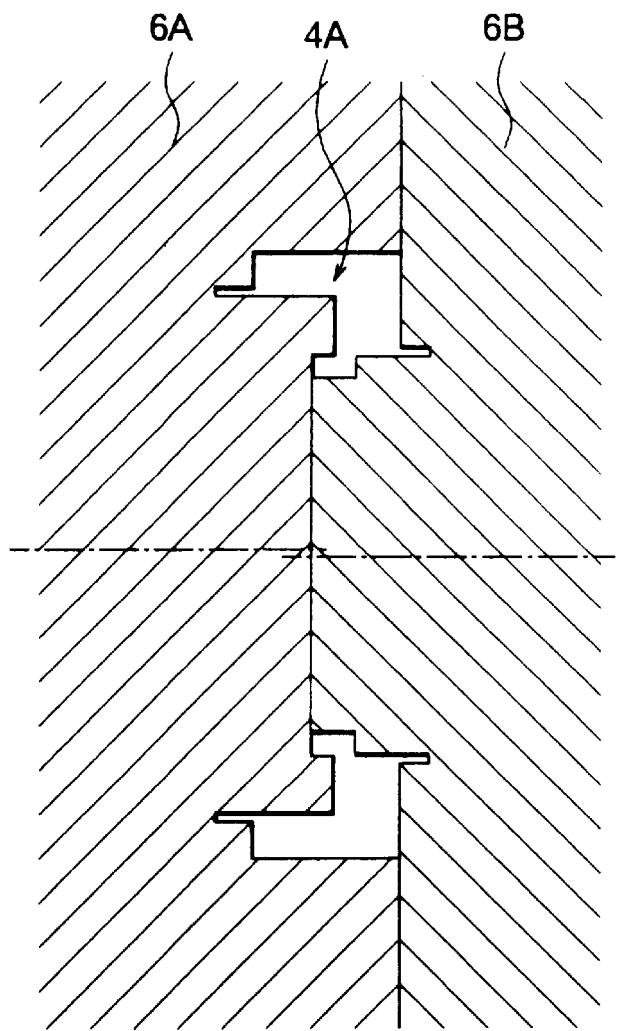

FIG. 5A
PRIOR ART
FIG. 5B
PRIOR ART
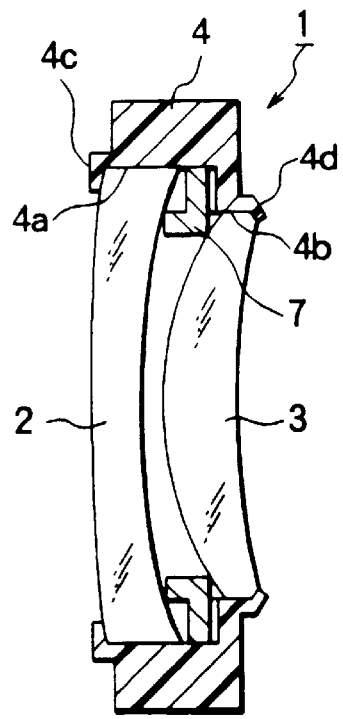
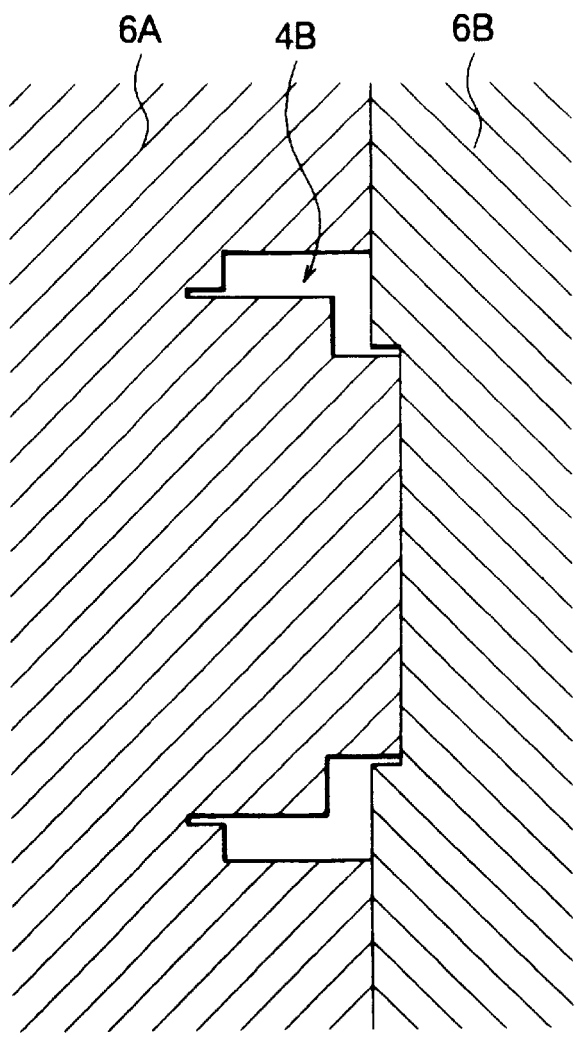

LENS BARREL

This application claims the benefit of Japanese Application No. 8-136395 which is hereby incorporated by reference.

BACKGROUND OF THE INVENTION

1. Field of the Invention

The present invention relates generally to a lens barrel of a camera or an interchangeable lens detachably attached to the camera and, more particularly, to a lens frame structure in the lens barrel, which is used for incorporating and holding a plurality of lens elements to a lens frame, and a molding die structure for molding the lens frame.

2. Related Background Art

A lens barrel incorporates a single or a plurality of lens units as a photographing optical system. There has hitherto been known a lens assembly body constructed of the plurality of lens elements constituting the above lens unit and a lens frame incorporating and holding these lens elements.

As a method of incorporating, fixing and thus holding two lenses 2, 3 at a predetermined interval into a lens frame 4 in a lens barrel 1 of the type described above, there is known a first method of, for example, as illustrated in FIG. 4A, providing an inward flange wall 5 having a predetermined thickness at a central portion, in the optical-axis direction, of an inner peripheral portion of the lens frame 4, incorporating the lenses 3, 4 from both sides into lens chambers 4a, 4b provided on both sides of the flange wall 5, and holding these lenses. Herein, holding portions designated by 4c, 4d in FIG. 4A are provided at edges of apertures of the lens chambers 4a, 4b, and are deformed to hold outer edges of the lenses in a state of incorporating the lenses 2, 3 as shown in FIG. 4A.

Further, the thus constructed lens frame 4 is formed of a synthetic resin as a molding frame by use of a cavity (4A) shaped by a pair of molding dies 6A, 6B for forming as illustrated in FIG. 4B.

Known also is a second method wherein, as illustrated in FIG. 5A, a spacing ring 7 is interposed between the lenses 2, 3 incorporated into the lens frame 4 to secure a spacing between the two lenses 2, 3.

Herein, the lens frame 4 is, as shown in FIG. 5B, formed as a molding frame in shape of a cavity (4B) defined by the molding dies 6A, 6B. Further, the spacing ring 7 described above is also formed by the molding dies (unillustrated) taking proper configurations.

According to the first method, however, in a molding die structure of the molding dies 6A, 6B in the case of forming the lens frame 4 by use of a resin, the molding die 6A for forming one part of the cavity that serves as one chamber with the flange wall 5 of the lens frame 4 being sandwiched therebetween, is different from the molding die 6B for forming the other part of the cavity that serves as the other chamber. Therefore, when closing the dies, there might be caused a deviation, though it falls within a range of 10 μm or under, between the center of one molding die 6A and the center of the other molding die 6B. Accordingly, in the lens frame 4 molded as a resinous molded product as shown in FIGS. 4A and 4B, there must be a deviation between the center of the lens chamber 4a accommodating one lens 2 and the center of the lens chamber 4b accommodating the other lens 3. As a result, the optical axes of the lenses incorporated into those lens chambers are off-center relatively, resulting in such a problem that a desired lens characteristic in this lens assembly body might not be acquired.

Further, according to the second method described above, as illustrated in FIGS. 5A and 5B, it is feasible to form the lens chamber 4a accommodating one lens 2 and the lens chamber 4b accommodating the other lens 3 in the lens frame 4 by use of the same molding die 6A. The space ring 7 is, however, another part. Therefore, if the space ring 7 is incorporated with an eccentricity corresponding to a gap produced because of an outside diameter of the space ring 7 and inside diameters of the respective lens chambers, this leads to a problem in which the optical axes of the lenses 2, 3 are inclined.

SUMMARY OF THE INVENTION

It is a primary object of the present invention, which was made under such circumstances, to provide a lens barrel including a lens frame formed as a resinous molded product, which is capable of preventing a lens chamber accommodating one lens and a lens chamber accommodating the other lens are disposed off-center due to an eccentricity between one molding die and the other molding die when closing molding dies.

To accomplish this, a lens barrel according to the present invention comprises a plurality of lenses, a lens holding member for holding the lenses at a predetermined spacing to make optical axes of the lenses coincident, and space walls serving as contact members provided integrally in at least three positions at equal intervals in a peripheral direction along an inner peripheral wall portion of the lens holding member so as to come in contact with face-to-face lens surface of at least two lenses of those lenses. The inner peripheral wall portion for holding at least two lenses within the lens holding member, is formed by one of a pair of molding dies.

According to the present invention, the space walls for keeping the spacing between the lenses in the lens holding member are provided at the equal intervals in at least three positions in the peripheral direction. One molding die faces to the other molding die with a gap between these space walls in the peripheral direction. The inner peripheral wall portions for defining the lens chambers accommodating the lenses on both sides in the optical-axis direction of these space walls, are formed by one molding die, excluding portions intercepted by the space walls. Further, the portions intercepted by the space walls are formed having a diameter larger than the inner peripheral wall portions by the other molding die.

For example, if outside diameters of the two lenses are different, the molding die on the side of the lens chamber incorporating the large-diameter lens shapes the inner peripheral wall portions for defining the large-diameter lens chamber. This molding die shapes the portions excluding the surfaces, facing to the small-diameter lines, of the space walls with respect to the inner peripheral wall portion of the lens chamber accommodating the small-diameter lens, as well as excluding the portions intercepted by these space walls. Further, the surfaces, facing to the small-diameter lens, of the space walls and the portions intercepted by the space walls, are formed by the other molding die.

Then, according to the present invention, the inner peripheral wall of the lens holding member for incorporating at least two lenses can be formed by the same molding die. Hence, even if die mismatching is caused when closing the dies, there might be not eccentricity between the lens chambers accommodating the lenses. The assembly can be thereby made to let the optical axes of the respective lenses coincident.

BRIEF DESCRIPTION OF THE DRAWINGS

Other objects and advantages of the present invention will become apparent during the following discussion in conjunction with the accompanying drawings, in which:

FIG. 4A is a sectional view of the principal portion of a lens assembly body in a prior art lens barrel; FIG. 4B is an explanatory view illustrating a structure of molding dies for forming a lens frame thereof; and FIG. 5A is a sectional view showing another example of the principal portion of the lens assembly body in the prior art lens barrel; FIG. 5B is an explanatory view illustrating a structure of molding dies for forming the lens frame thereof.

DESCRIPTION OF THE PREFERRED EMBODIMENTS

Figure 1A:
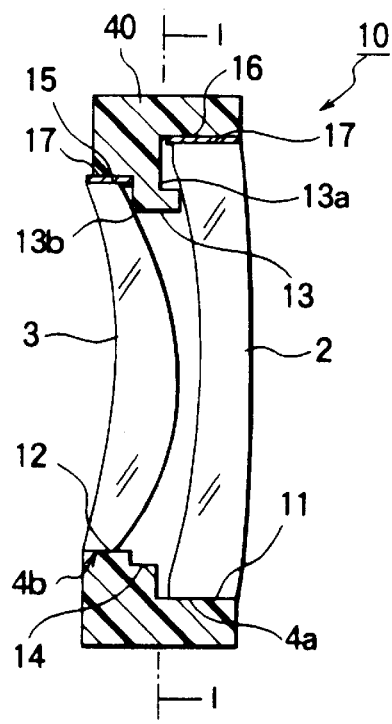
FIG. 1A is a sectional view showing the principal portion of a lens assembly body in one embodiment of a lens barrel according to the present invention.
Figure 1B:
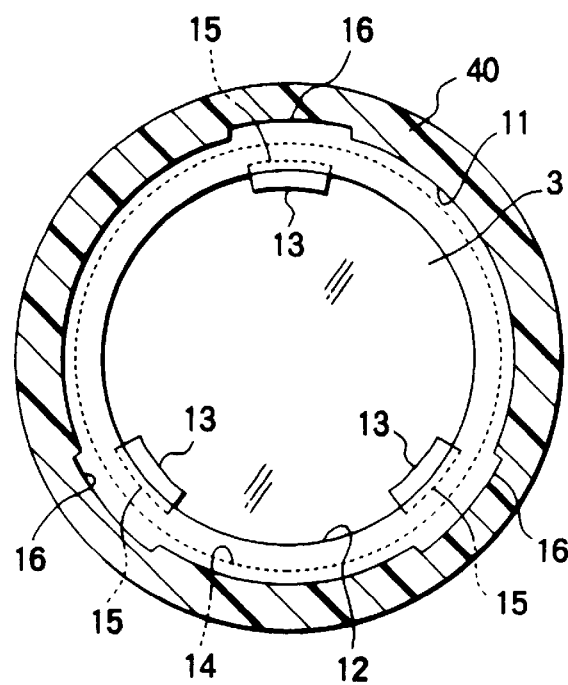
FIG. 1B is a sectional view taken along the line I—I in FIG. 1A in one embodiment thereof.
Figure 2:
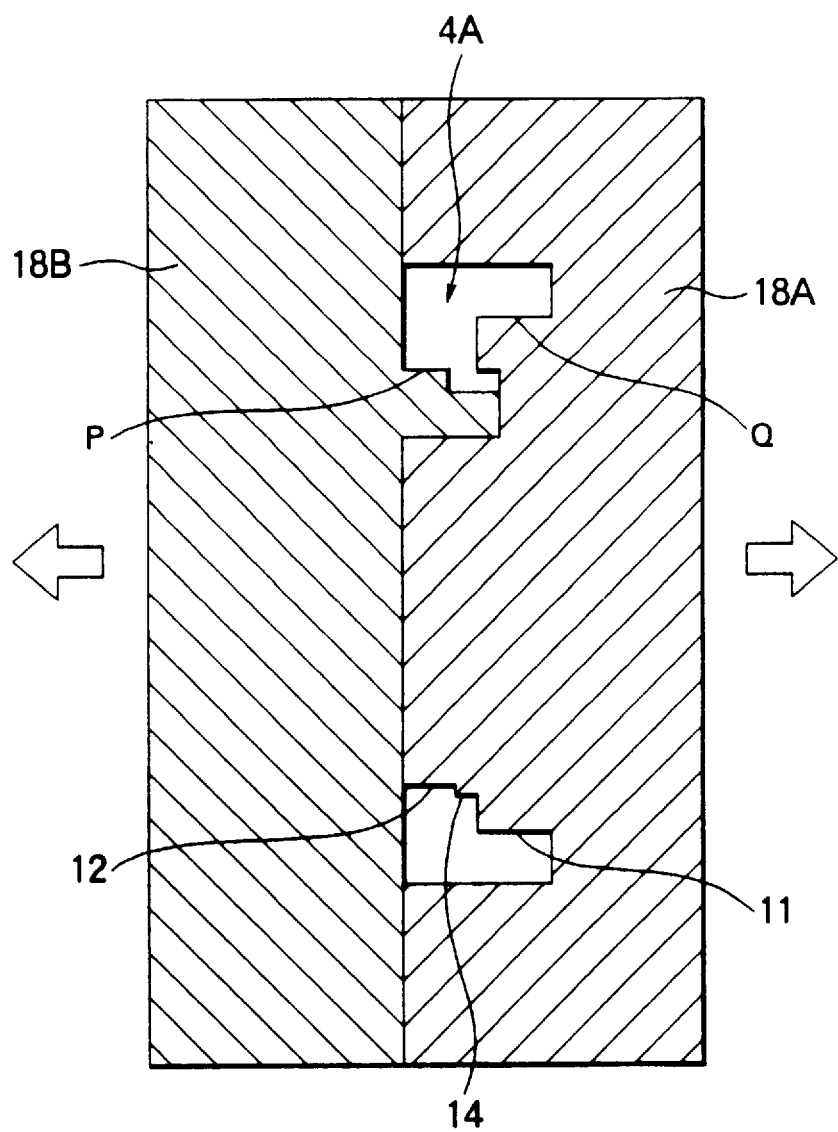
FIG. 2 is an explanatory view illustrating a structure of molding dies for forming a lens frame in FIGS. 1A and 1B.

FIGS. 1A, 1B and 2 illustrate one embodiment of a lens barrel according to the present invention. Throughout these Figures, the same or corresponding portions to those shown in FIGS. 4A, 4B, 5A and 5B are marked with the numerals, and their explanations are omitted.

Herein, in this embodiment, the lenses 2, 3 are adhesively fixed to a lens frame 40.

In this embodiments, a lens assembly 10 includes the lens frame 40 for holding the large and small lenses 2, 3 at a predetermined distance, further for making the optical axes of each lens coincident. A space wall 13 is integrally provided in the lens frame 40 at three portions trisected circumferentially between a large inner peripheral wall portion 11 and a small inner peripheral wall portion 12 for constituting lens chambers 4a, 4b. The space walls 13 serve as contact members having contact portions 13a, 13b interposed between lens faces, facing each other, of the lenses 2 and 3. A predetermined gap is formed between the lens faces by the wall 13.

In accordance with this embodiment, the space walls 13 are provided at equal intervals in the peripheral direction, whereby the inner peripheral wall portion 12 for defining the lens chamber 4b having a small diameter is formed by a molding die 18A in FIG. 2 for molding the inner peripheral wall portion 11 for defining the lens chamber 4a having a larger diameter, excluding portions provided with lens face-to-face space walls 13.

In other words, in this embodiment, one molding die (18A o the right side in FIG. 2) is rendered opposite to the other molding die 18B with a gap in the peripheral direction so that the three space walls 13 are disposed at the equal intervals to keep the spacing between the large-diameter lens 2 and the small-diameter lens 3 in the lens frame 40. Then, the inner peripheral wall portions 11, 12, which define the lens chambers 4a, 4b so as to incorporate the lenses 2, 3 on both sides in the optical-axis direction of the space walls 13, are formed by one molding die 18A excluding the portions provided with the space walls 13. This molding die 18A forms the large diameter lens chamber 4a of the lens chambers described above in continuation from the small-diameter lens chamber 4b.

Note that circular arc wall portions designated by 14 in the Figures constitute the portions excluding the space walls 13 in between the inner peripheral wall portions 11, 12.

The portions intercepted by the space walls 13 are formed to have a diameter larger than the inner peripheral wall portion 12 by use of the other molding die (a portion P of the molding die 18B on the left wide in FIG. 2). Large-diameter circular arc groove portions 15 as indicated by broken lines in FIG. 1B are thereby formed in three positions in the peripheral direction. This molding die 18B also forms surfaces, opposite to the small-diameter lens chamber 4b, of the space walls 13.

Further, in the inner peripheral wall portion 11 defining the large-diameter lens chamber 4a, circular arc groove portions 16 having a diameter larger than the inner peripheral wall portion 11, are similarly formed in the peripheral direction by portions, indicated by Q in FIG. 2, of the molding die 18A, which portions are disposed substantially in a side-by-side relationship with the space walls 13 and the circular arc groove portions 15 corresponding thereto.

These circular arc groove portions 15, 16, when incorporating the lenses 2, 3 into the lens chambers 4a, 4b as shown in FIG. 1A, serve as reservoir portions for an adhesive agent 17 for adhesively fixing the outer edges of the lenses 2, 3 to the inner peripheral wall portions 11, 12.

The following is a problem arising when in a molding process using the molding dies 18A, 18B shown in FIG. 2, which form a cavity 4A for forming the lens frame 40.

The inner peripheral wall portion 11 incorporating the large-diameter lens 2 and the inner peripheral wall portion 12 incorporating the lens 3 having the diameter smaller than the lens 2, are formed by the large-diameter molding die 18A. According to such a molding die structure, the molding dies 18A, 18B are, as indicated by arrows in FIG. 2, opened in the right and left directions, and hence a removal slope in a die removal is required of the inner peripheral wall portions 11, 12. When giving this removal slope thereto, it might happen that there is increased a backlash enough to cause an eccentricity when incorporating the lenses 2, 3. Therefore, the molding dies for forming the inner peripheral wall portions 11, 12 are integrally formed, though not illustrated, by a slide die, and, besides, this slide die is slid in a direction orthogonal to the optical axis when opening the molding dies 18A, 18B. If constructed in this way, there is no necessity for providing the removal slopes.

Moreover, if unable to construct it based on the slide type because of small diameters of the lenses 2, 3, it follows that the removal slopes are given thereto. In such a case, even if the removal slopes are provided, a portion in close proximity to the inner peripheral wall portion 12 may be formed with an area with a slightly enlarged diameter as in the case of the circular arc wall portion indicated by 14 in FIG. 2.

Further, in this embodiment, the contact members for keeping the spacing between the lenses 2, 3 involve the use of the space walls 13 provided integrally with the lens frame 40. This eliminates the requirement for using other parts to keep the above spacing, whereby the assembly can be facilitated with a less number of parts.

Figure 3A:
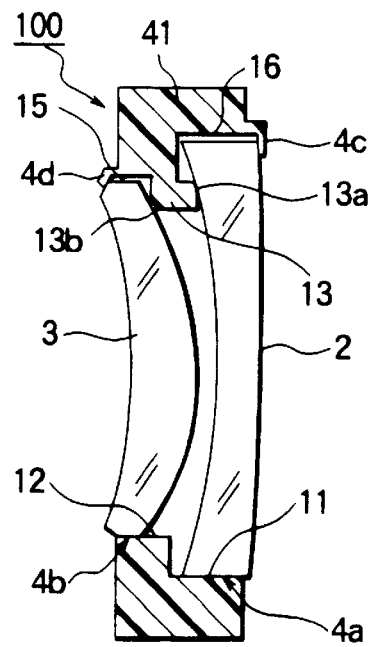
FIG. 3A is a sectional view showing the principal portion of the lens assembly body in another embodiment of the lens barrel according to the present invention.
Figure 3B:
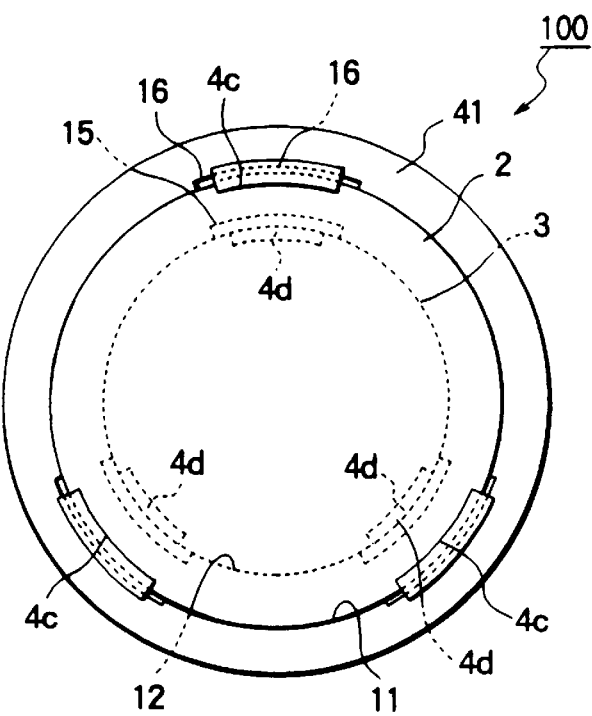
FIG. 3B is a side view thereof.

FIGS. 3A and 3B show another embodiment of the present invention. This embodiment exemplifies a case where the fixation is made by making use of tongue-like presser portions 4c, 4d at the edge of the aperture as explained in FIGS. 5A and 5B instead of the bonding for fixing the lenses in the embodiment shown in FIGS. 1A and 1b.

In this embodiment, the presser portions 4c, 4d of a lens frame 41 of a lens assembly body 100 are provided in such a way that each set of fringe portions disposed in three positions at equal intervals in the peripheral direction at the edge of the aperture of each of the lens chambers 4a, 4b are, after incorporating the lenses 2, 3, varied in shape and fixed by pressing them.

Note that the constructions other than the above-mentioned are the same as those in FIGS. 1A, 1B, 5A and 5B, and the specific explanations thereof are omitted.

Incidentally, the present invention is not limited to the structures in the embodiments discussed above and may be, as a matter of course, properly modified and changed in terms of configurations and structures of the respective portions. For instance, the lens assembly body 1 consisting of the lens frames 40, 41 and the lenses 2, 3 held by the lens frame, is not confined to the structures in the embodiments discussed above. There may be considered a variety of modifications of the configurations and structures of the lens frames 40, 41, the numbers, the diametrical dimensions and the lens shapes, whether convex or concave, of the lenses held by the lens frame, and further the lens incorporating structure. In short, what is required of the construction may be such that the respective inner peripheral surface portions for holding at least two lenses with the lens frame are formed by one molding die.

Moreover, the lens barrel using the lens assembly body 1 described above may be a lens barrel provided integrally with the camera or an interchangeable type of lens barrel detachably attached to the camera.

The fixing mechanism for incorporating the lenses 2, 3 into the lens frame 40 involves the use of the securing mechanism using the bonding agent 17, the holding mechanism using the tongue-like presser portions 4c, 4d, and further the mechanical stop member such as the stop ring 21.

Further, the space walls 13 provided integrally with the lens frame are used as the contact members for holding the lenses 2, 3 at the equal intervals within the lens frame 40.

As explained above, the lens barrel in this embodiment includes the plurality of lenses, the lens frame for holding the lenses at the predetermined intervals so as to make the optical axes of the lenses coincident, and the space walls integrally provided as the contact members in at least three positions at the equal intervals in the peripheral direction along the inner peripheral wall portion of the lens frame so as to contact the face-to-face lens surfaces of at least two lenses among the plurality of lenses. The inner peripheral wall portion for holding at least two lenses in the lens frame is formed by one molding die. The lens barrel is thus simply constructed and, nevertheless, exhibits the effects which follow.

That is, in accordance with this embodiment, when the lens frame of the lens barrel is formed as a resinous molded product, the space walls for holding the spacing between the lenses in the lens frame are disposed at the equal intervals in at least three positions in the peripheral direction. Then, one molding die faces to the other molding die so that these space walls are formed at the intervals in the peripheral direction. The inner peripheral wall portions for defining the lens chambers accommodating the lenses are formed on both sides in the optical-axis direction with respect to the space walls, are formed by one molding die, excluding the portions provided with the space walls. It is therefore possible to prevent the lens chamber accommodating one lens and the lens chamber accommodating the other lens from being disposed off-center due to the eccentricity between one molding die and the other molding die when clamping the molding dies.

Then, in the embodiment described above, the lens spacing within the lens frame can be secured, and the optical axes of the lenses can be kept coincident without causing the positional deviation therebetween by using no separate parts. Furthermore, the assembly can be facilitated with the less number of components.

It is apparent that, in this invention, a wide range of different working modes can be formed based on the invention without deviating from the spirit and scope of the invention. This invention is not restricted by its specific working modes except being limited by the appended claims.

What is claimed is:

1. A lens barrel comprising:

a plurality of lenses;

a lens holding member for holding said lenses at a predetermined spacing to make optical axes of said lenses coincident; and at least three contact members disposed circumferentially at substantially equal intervals along an inner peripheral wall portion of said lens holding member so as to come in contact with lens surfaces, facing each other, of at least two lenses of said lenses, wherein said inner peripheral wall portion for holding at least said two lenses within said lens holding member, is formed by one of a pair of molding dies.

2. The lens barrel according to claim 1, wherein said contact members are formed integrally with said lens holding member, and form a spacing between the lens surfaces.

3. The lens barrel according to claim 2, wherein portions in which the spacing is intercepted by said contact members are formed by said other molding die.

4. The lens barrel according to claim 3, wherein at least said two lenses have diameters different from each other, a circumferential wall portion having a large diameter and a circumferential wall portion having a small diameter are formed by said one molding die, and the portions in which the spacing is intercepted by said contact members and a surface facing small-diameter lens of said at least two lenses are formed by said other molding die.

5. The lens barrel according to claim 1, wherein said peripheral wall portion is formed with circular arc grooves corresponding to positions of said contact members in the circumferential direction.

6. The lens barrel according to claim 5, wherein said circular arc grooves are formed with adhesive agent layers for fixing said lenses.

* * * * *